United States Patent
Wysocki et al.

[11] 3,718,380
[45] Feb. 27, 1973

[54] IMAGING SYSTEM IN WHICH EITHER A LIQUID CRYSTALLINE MATERIAL OR AN ELECTRODE IS SHAPED IN AN IMAGE CONFIGURATION

[75] Inventors: Joseph J. Wysocki, James E. Adams, both of Webster, James H. Becker, Penfield, Robert W. Madrid, Macedon, Werner E. Haas, Webster all of N.Y.

[73] Assignee: Xerox Corporation, Rochester, N.Y.

[22] Filed: Aug. 5, 1971

[21] Appl. No.: 169,465

Related U.S. Application Data

[62] Division of Ser. No. 821,565, May 5, 1969, Pat. No. 3,652,148.

[52] U.S. Cl.............................................350/160 LC
[51] Int. Cl...............................................G02f 1/16
[58] Field of Search................................350/160 LC

[56] References Cited

UNITED STATES PATENTS 3,627,408  12/1971  Fergason.....................350/160 LC

*Primary Examiner*—Ronald L. Wibert
*Assistant Examiner*—Edward S. Bauer
*Attorney*—Roger W. Parkhurst

[57] ABSTRACT

A system transforming an optically negative liquid crystalline substance to an optically positive liquid crystalline mesophase by an applied electrical field, and an imaging system wherein the electrical field-induced transition images a liquid crystalline member.

14 Claims, 10 Drawing Figures

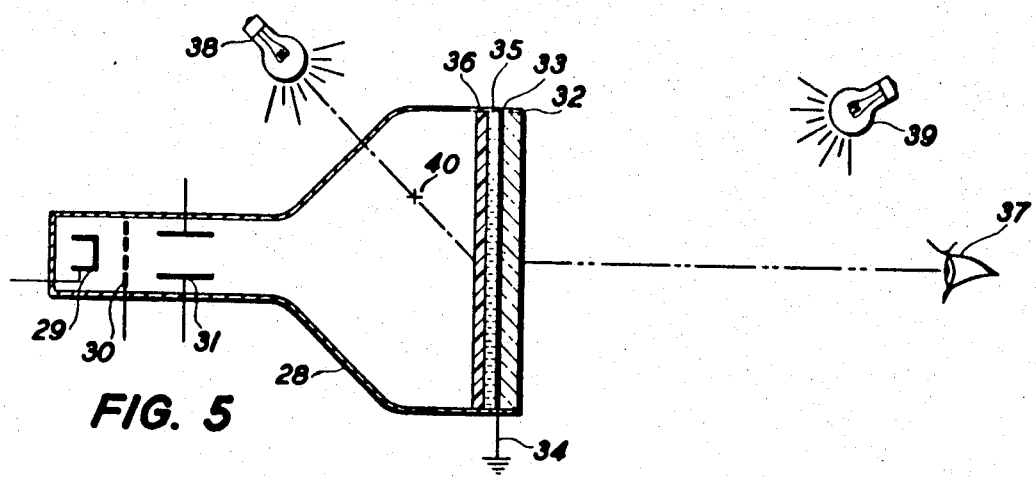
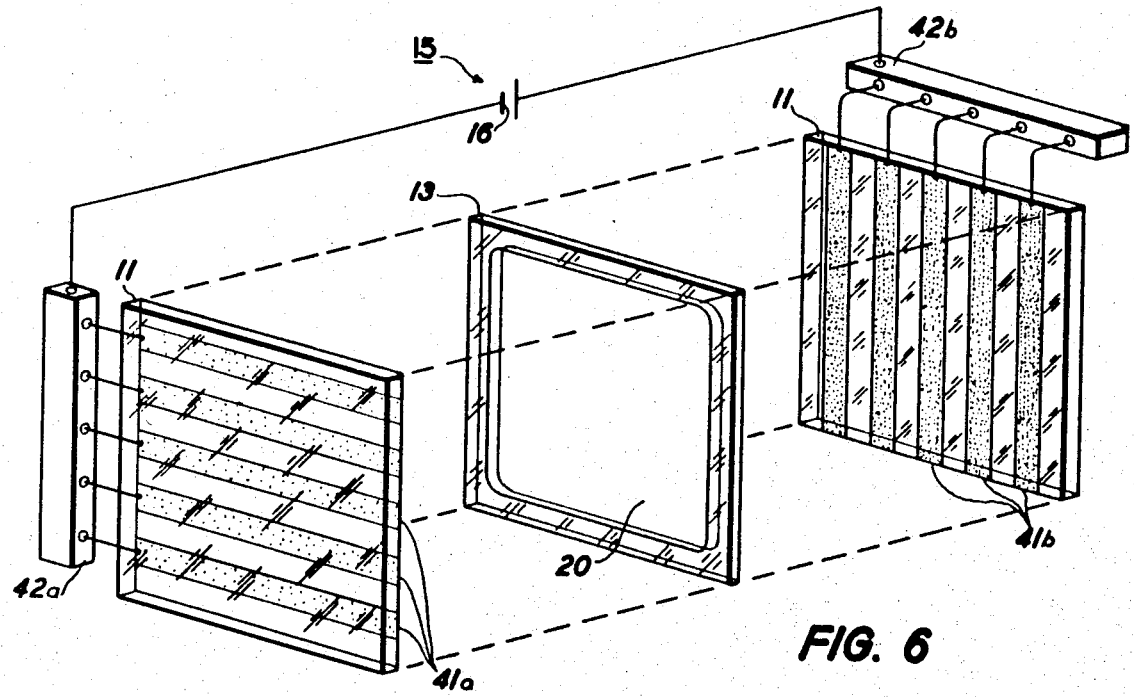
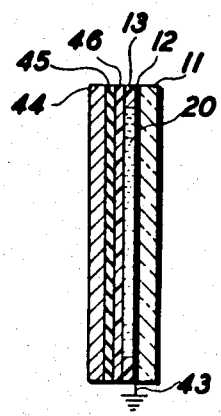

E THRESH×10⁻⁵ (v/c)

30% C.C.
56% C.N.
14% C.O.C.

IMAGING SYSTEM IN WHICH EITHER A LIQUID CRYSTALLINE MATERIAL OR AN ELECTRODE IS SHAPED IN AN IMAGE CONFIGURATION

CROSS-REFERENCE TO RELATED APPLICATIONS

This is a division of application Ser. No. 821,565, filed May 5, 1969 now U.S. Pat. No. 3,652,148.

BACKGROUND OF THE INVENTION

This invention relates to imaging systems, and more specifically, to an imaging system wherein the imaging member comprises a liquid crystalline substance.

Many chemical compounds and mixtures have been found to exhibit physical characteristics some of which are typically associated with liquids and others which are typically unique to solid crystals. Liquid crystalline substances typically exhibit the mechanical characteristics, such as viscosities, which are ordinarily associated with liquids. In addition, the optical scattering and transmission characteristics of liquid crystalline substances are similar to those characteristics which are typically unique to solid crystals. Because of these similarities to both the liquid and crystalline forms of matter, the name "liquid crystals" has become generic to substances exhibiting these dual properties.

The molecular structure of liquid crystals helps to explain their dual characteristics. In liquid or fluid substances, the molecules are typically randomly distributed and oriented throughout the mass. Conversely, in crystalline solids the molecules are typically rigidly oriented and arranged in a specific crystalline structure. Liquid crystals resemble solid crystals in that the molecules of the liquid crystalline substance are regularly oriented in a fashion analogous to but less extensive than the molecular orientation and structure in a crystalline solid. It has been observed that many substances exhibit liquid crystalline characteristics only in a relatively narrow temperature range; below this temperature range the substances appear only as crystalline solids, and above the temperature range they appear only as liquids. Liquid crystals are known to appear in at least three different forms: the smectic, nematic, and cholesteric forms. These structural forms are sometimes referred to as mesophases, thereby indicating that they are states of matter intermediate between the liquid and crystalline states.

In the smectic structure the molecules are arranged in layers with their major axes approximately parallel to each other and approximately normal to the planes of said layers. Within a given layer the molecules may be organized in uniform rows, or randomly distributed throughout the layer, but in either case the major axes are still approximately normal to the plane of the layer. The attractive forces between layers are relatively weak so that the layers are free to move in relation to each other, thereby providing the smectic liquid crystalline substance with the mechanical properties of a planar or two-dimensional, soap-like fluid.

In the nematic structure, the major axes of the molecules lie approximately parallel to each other, but the molecules are not organized into definite layers as in the smectic structure.

In the cholesteric structure, the molecules are believed to be arranged in definite layers as in the smectic structure; however, within a given layer, the molecules are believed to be arranged with their major axes approximately parallel in a fashion resembling the structure of nematic liquid crystals. Because the major axes of the molecules in the cholesteric structure are believed to be parallel to the planes of the layers, the molecular layers are very thin. The cholesteric structure derives its name from the fact that materials exhibiting the cholesteric liquid crystalline structure typically have molecules which are derivatives of cholesterol or which are shaped very similarly to molecules of cholesterol. Because of the shape of the cholesteric molecule, in the cholesteric structure the direction of the major axes of the molecules in each of the aforementioned thin layers is displaced slightly from the direction of the major molecular axes in the adjacent molecular layers. When compared to a hypothetical straight line axis passing through a cholesteric liquid crystalline substance and perpendicular to the molecular planes within said substance, the angular displacement of the direction of the molecular axes within each adjacent molecular layer traces out a helical path around the hypothetical straight line axis.

Liquid crystals have been found to be sensitive or responsive to temperature, pressure, foreign chemical compounds and to electric and magnetic fields, as disclosed in copending applications Ser. No. 646,532, filed June 16, 1967 and, Ser. No. 646,533, filed June 16, 1967 now abandoned, Fergason et al. U.S. Pat. No. 3,114,838, French Pat. No. 1,484,584 and Fergason U.S. Pat. No. 3,409,404.

Cholesteric liquid crystals are known to be responsive to electrical fields (see Harper, W.J., "Voltage Effects in Cholesteric Liquid Crystals," in *Molecular Crystals*, Vol. 1, 1966, pages 325–332.) The effects of an electrical field upon a sample of a liquid crystalline substance has typically been observed in a cell comprising a film of liquid crystals sandwiched between transparent electrodes, as disclosed, for example, in copending application Ser. No. 646,532, filed June 16, 1967, and French Pat. No. 1,484,584. In both of these references liquid crystals are used for imaging in response to electrical fields. The imaging in prior art devices has typically comprised modification of the optical properties of the liquid crystalline substance maintaining its original liquid crystalline mesophase form, i.e., smectic, nematic, or cholesteric. Recently, however, nmr spectral studies have shown that a magnetic field may cause a cholesteric liquid crystalline substance to go through a phase transition to the nematic liquid crystalline structure (see Sackmann, Meiboom, and Snyder, "On the Relation of Nematic to Cholesteric Mesophases," in J. Am. Chem. Soc., 89:23, Nov. 8, 1967.).

In new and growing areas of technology such as liquid crystalline imaging systems, new methods, apparatus, compositions, and articles of manufacture are often discovered for the application of the new technology in a new mode. The present invention relates to a new and advantageous system for imaging a liquid crystalline imaging member.

SUMMARY OF THE INVENTION

It is, therefore, an object of this invention to provide a novel imaging system.

It is another object of this invention to provide a novel liquid crystal imaging system.

It is another object of this invention to transform an optically negative liquid crystalline substance into an optically positive liquid crystalline structure.

It is another object of this invention to transform a cholesteric liquid crystalline substance into the nematic liquid crystal in an applied electrical field.

It is another object of this invention to transform a cholesteric liquid crystal to a nematic liquid crystalline structure in an applied electrical field.

It is another object of this invention to transform an optically negative liquid crystal to an optically positive liquid crystal by adjusting the temperature of the liquid crystalline substance within an electrical field.

It is another object of this invention to transform a cholesteric liquid crystal to the nematic mesophase by adjusting the temperature of the cholesteric liquid crystalline substance within an electrical field.

It is another object of this invention to provide an imaging system which produces intense and sharply defined images.

It is yet another object of this invention to provide a transient imaging system.

It is another object of this invention to permit a liquid crystalline substance in a field-induced optically positive state to relax back to its normal optically negative state.

It is another object of this invention to transform a liquid crystalline substance in the field-induced nematic mesophase back to its normal cholesteric mesophase structure.

It is another object of this invention to allow a liquid crystalline substance in a field-induced optically positive state to relax back into its normal optically negative state without the application of external electrical or magnetic fields.

It is another object of this invention to transform a liquid crystalline substance in its field-induced nematic mesophase back to its normal cholesteric mesophase without the application of external electrical or magnetic fields.

It is yet another object of this invention to provide a color imaging system.

It is another object of this invention to produce a transient color display system.

It is another object of this invention to produce an imaging system suitable for use in display devices which may be addressed by various thermal and electrical means.

The foregoing objects and others are accomplished in accordance with this invention by a system transforming an optically negative liquid crystalline substance to an optically positive liquid crystalline state by an applied electrical field, and an imaging system wherein the electrical field-induced transition images a liquid crystalline member.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein:

FIG. 5 illustrates an imaging system wherein a liquid crystalline imaging member is imaged by an electron beam address system.

FIG. 5 is a cross-sectional view of an imaging system wherein a liquid crystalline imaging member is imaged by an electron beam address system.

FIG. 6 is an exploded isometric view of an imaging system wherein a liquid crystalline imaging member is imaged by an X-Y address system.

FIG. 7 is a cross-sectional view of an imaging system wherein a liquid crystalline imaging member is imaged by an electrostatic latent image on an electrostatic latent image support surface.

DESCRIPTION OF THE PREFERRED EMBODIMENTS

Figure 1:
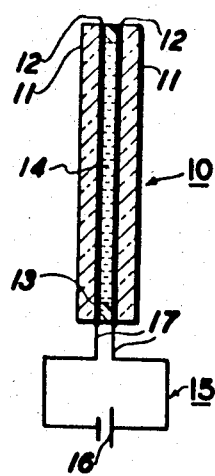
FIG. 1 is a cross-sectional view of a liquid crystalline imaging member.

In FIG. 1 a typical liquid crystalline imaging member 10, sometimes referred to as an electroded imaging sandwich, is shown in cross-section wherein a pair of transparent plates 11 having substantially transparent conductive coating 12 upon the contact surface, comprise a parallel pair of substantially transparent electrodes. An imaging member wherein both electrodes are transparent is preferred where the imaging member is to be viewed using transmitted light; however, a liquid crystalline imaging member may also be viewed using reflected light thereby requiring only a single transparent electrode while the other may be opaque. The transparent electrodes are separated by spacing member 13 which contains voids which form one or more shallow cups which contain the liquid crystalline film or layer which comprises the active element of the imaging member. A field is created between the electrodes by an external circuit 15 which typically comprises a source of potential 16 which is connected across the two electrodes through leads 17. The potential source may be either d.c., a.c. or a combination thereof.

In the surprising and advantageous system of the present invention it has been discovered that when cholesteric liquid crystals or a mixture of cholesteric liquid crystalline substances is used in an electrode sandwich such as that described in FIG. 1, that high electrical fields across the liquid crystal film cause an electrical field-induced phase transition to occur wherein the optically negative cholesteric liquid crystalline substance transforms into an optically positive liquid crystalline state. This transition is believed to be the result of the cholesteric liquid crystal transforming into the nematic liquid crystalline mesophase structure. Cholesteric liquid crystals in the cholesteric state are typically translucent, for example, like a milky white, opalescent layer, when first placed in the unbiased electrode sandwich. When the high electric field is placed across the liquid crystal film, the field-induced phase change is observable because the liquid crystal film becomes transparent in areas where the field is present. When viewed between polarizers with transmitted light, for example as described in conjunction with FIG. 4 below, the areas in which the field-induced phase change has taken place appear dark, while the unchanged, translucent, light scattering and birefringent, cholesteric areas still retain their light appearance. Any other means suitable for enhancing the contrast of the imaged areas may also be used in place of the polarizers. Hence, it is seen that either field or non-field areas in a liquid crystalline imaging sandwich may be used to create the desired image, with or without the addition of means for image enhancement. The optical negative-positive, cholestericnematic phase transition has also been confirmed by experiments using a polarizing microscope (see Examples below).

In the liquid crystal imaging members described in FIG. 1 the electrodes may be of any suitable transparent conductive material. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings are typically evaporated onto the more insulating, transparent substrate. NESA glass, a tin oxide coated glass manufactured by the Pittsburgh Plate Glass Company, is a commercially available example of a typical transparent, conductive electrode material.

The spacer, 13 of FIG. 1, which separates the transparent electrodes and contains the liquid crystal film between said electrodes, is typically chemically inert, transparent, not birefringent, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate, and mixtures thereof.

The liquid crystal imaging film 14 may comprise any suitable cholesteric liquid crystal or mixture of cholesteric liquid crystals. Typical cholesteric liquid crystals include derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example cholesteryl crotonate; cholesteryl nonanoate; cholesteryl hexanoate; cholesteryl formate; cholesteryl docosonoate; cholesteryl chloroformate; cholesteryl propionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl heptyl carbamate; and alkyl amides and aliphatic secondary amines derived from $3\beta$-amino-$\Delta^5$-cholestene and mixtures thereof; peptides such as cholesteryl poly-$\gamma$-benzyl-$l$-glutamate; derivatives of beta sitosterol such as sitosteryl chloride; and amyl ester of cyano benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

Mixtures of liquid crystals can be prepared in organic solvents such as chloroform, petroleum ether, methylethyl ketone and others, which are typically subsequently evaporated from the mixture thereby leaving the liquid crystalline mixture. Alternatively, the individual liquid crystals of the liquid crystalline mixture can be combined directly by heating the mixed components above the isotropic transition temperature.

Figure 2:
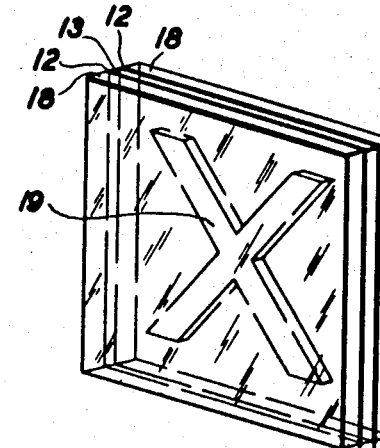
FIG. 2 is an isometric view of an embodiment of a liquid crystalline imaging member wherein the desired image is defined by the shape of the spacing member.

In FIG. 2 the embodiment of the liquid crystal imaging member described in FIG. 1 is shown with the desired image defined by the shape of the void areas in the spacer gasket 13. As before, transparent electrodes 18 are separated by the spacer 13, but the entire desired image area 19 comprises the liquid crystal film or layer. In this embodiment the entire inner faces of the transparent electrodes comprise substantially transparent conductive coating 12 and the conductive coatings are electrically connected to external circuit 15. In operation there is an electrical field across the entire area of the spacer 13, however the image caused by the electrical field-induced phase transition in the liquid crystal film, occurs only in the area 19 where the liquid crystal film is present. Again here, depending upon whether the desired image is to be viewed by transmitted or reflected light, both or only one of the electrodes, respectively, may be transparent.

Figure 3:
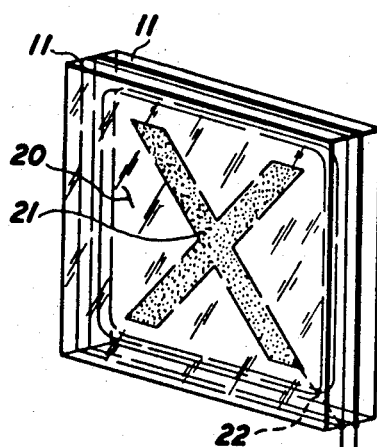
FIG. 3 is an isometric view of an embodiment of a liquid crystalline imaging member wherein the desired image is defined by the shape of at least one of the electrodes.

In FIG. 3 another preferred embodiment of the liquid crystal imaging member described in FIG. 1 is shown. In FIG. 3 the desired image is defined by the shape of an electrode, and therefore by the shape of the corresponding electrical field. The imaging member here comprises transparent plates 11 separated by spacer gasket 13 having void area 20 filled with liquid crystals, and comprising substantially the entire area of spacer layer 13. The desired image is defined by the shape of the substantially transparent conductive coating shown at 21, which is affixed to the inner surface of one or both of the transparent support plates 11, and is affixed only in the desired image configuration. The embodiment illustrated in FIG. 3 shows only one of the two electrodes in image configuration, however it will be understood by those skilled in the art that both electrodes could easily be made in a matched pair to define the same desired image. When the single image electrode configuration is used, the second electrode will comprise transparent plate 11 with substantially transparent conductive coating 12 upon the entire area of the inner surface of the transparent electrode. It is noted that a very thin, or substantially invisible conductor 22 is necessary in this embodiment to electrically connect the electrode in the desired image configuration to external circuit 15 which is similarly connected to the conductive coating of the opposite electrode. In operation this embodiment will produce an electric field only in areas where there are parallel electrodes, i.e., between the electrode in the desired image configuration, and the opposite electrode, whether or not the second electrode is also in the desired image configuration. Again here, one of the electrodes may be opaque if it is desired to observe the imaged member by reflected light rather than transmitted light.

Figure 4:
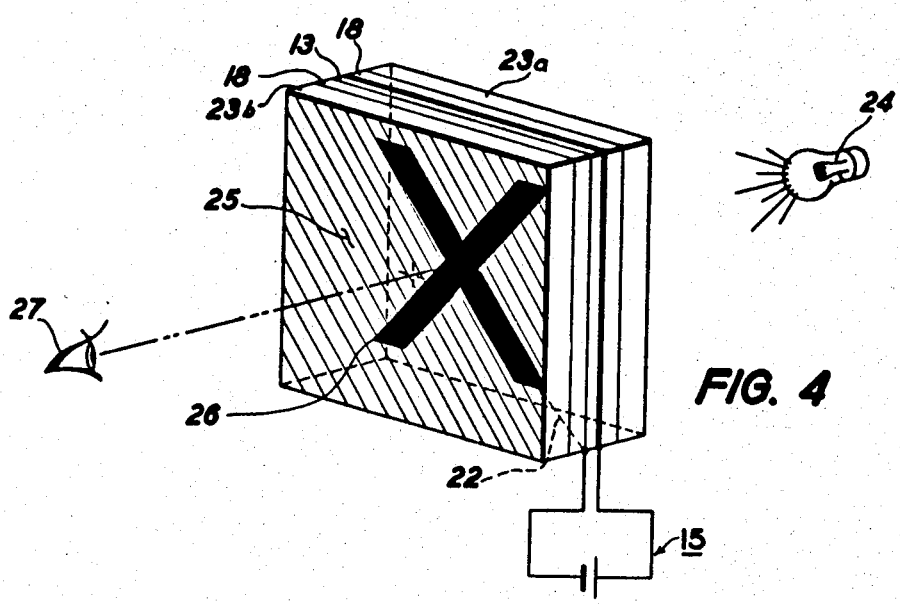
FIG. 4 is an isometric view of an embodiment wherein a typical liquid crystalline imaging member is viewed between polarizers.

In FIG. 4 a liquid crystal imaging member comprising a pair of substantially transparent electrodes 18 sandwiching a spacer 13 containing a liquid crystal film is shown being observed between polarizers 23. As described earlier, cholesteric liquid crystals are typically translucent, and when placed in the electrical field characteristic of the advantageous system of the present invention, the optical negative-positive, cholestericnematic phase change occurs thereby rendering the transformed portion of the liquid crystalline film substantially transparent to transmitted light. At the same time, those areas remaining in the cholesteric state remain light scattering and translucent. When such a liquid crystalline imaging sandwich is observed between polarizers, light from source 24 is planar polarized while passing through polarizer 23a, scattered by the translucent cholesteric liquid crystalline substance in non-image areas 25 (same as 20 in FIG. 3), and is transmitted by the field-induced nematic state areas 26. A viewer 27 then sees the planar-polarized light which passes through polarizer 23b which originated from source 24 and was scattered and passed through the non-image portion of spacer 13. Although the light was polarized by polarizer 23a in a plane crossed with the plane of polarizer 23b, the scattering effect of the cholesteric liquid crystal between the substantially transparent electrodes scattered sufficient amounts of the originally planar-polarized light to allow some of it to pass through polarizer 23b. However, in the image areas 26, the effect of polarizers 23, when said polarizers have their respective planes of polarization crossed, is to cut off the light transmitted through polarizer 23a and transformed image area 26 so that the image area 26 appears dark, as illustrated.

Although the embodiment of the advantageous system of the present invention illustrated in FIG. 4 shows a liquid crystalline imaging member being observed between polarizers, it will be appreciated that any other means for enhancing the contrast between image and non-image areas may perform the same function as the polarizers in the illustrated embodiment. For example, in addition to polarizers, an edge-lighting system wherein the normally translucent cholesteric liquid crystalline substance in non-imaged areas scatters the light entering the imaging member from its edge, so that only the light scattering cholesteric liquid crystalline areas are visible while the transformed, nematic areas remain transparent, may be used. It is therefore clear that any desired image may be created in dark-on-light or light-on-dark image-background combinations.

In FIG. 5 another preferred embodiment of the advantageous system of the present invention is illustrated wherein an electron beam address system is provided for the generation of an imagewise field across a liquid crystalline imaging member. In FIG. 5 the electron beam address system is within vacuum tube 28, and the address system itself comprises electron gun 29, accelerator 30 and deflector 31 which are provided with electrical leads through vacuum tube 28 so that suitable electrical circuitry may be connected therewith to operate the electron beam imaging system. The liquid crystalline imaging member in conjunction with the electron beam address system comprises substantially transparent substrate 32 upon which substantially transparent conductive coating 33 is affixed. Substantially transparent coating 33 is also grounded at 34. The liquid crystalline imaging layer 35 may be coated directly onto substantially transparent conductive layer 33, provided the liquid crystalline material has a sufficiently high viscosity to support itself on a surface even when the surface is oriented vertically or horizontally with the liquid crystalline imaging layer on the lower surface of such horizontal imaging member. Alternatively, transparent insulating layer 36 may be placed over the liquid crystalline imaging layer 35 to protect and support the liquid crystalline material. The impingement of electrons directed from electron gun 29 and impinging upon layer 36 or liquid crystalline imaging layer 35 creates a momentary field when taken in conjunction with grounded transparent conductive layer 33. This momentary field across liquid crystalline layer 35 causes the optical negative-positive, cholesteric-nematic phase transition of the advantageous system of the present invention, thereby creating an image visible to an observer 37.

Another embodiment of the electron beam address system is a configuration wherein the electric field created by the electron beam is transmitted through a thin layer which is substantially insulating in the lateral directions parallel with the plane of said layer, but is substantially conductive through the thickness of said layer in the direction perpendicular to the plane of the layer (i.e., a pin tube). This embodiment permits the liquid crystalline layer to be outside the vacuum system. For transient displays using this embodiment of the electron beam address system, the face plate is substantially insulating in all directions.

It will also be appreciated that the electron beam address system may be used in conjunction with an electroded liquid crystalline imaging member wherein the sum of the fields created by the electrode system and the electron beam address system is sufficient to create a total field of field strength greater than the threshold field value of the particular liquid crystalline imaging member. Similarly, any suitable combination of address systems including any of the other systems disclosed herein and even others, may be combined in the same manner so that the total field created by the combination of address systems has a field strength value greater than the threshold field for the particular liquid crystalline imaging member.

Again here it is noted that the sources of potential used in the circuits which produce the electrical fields in the various address systems suitable for use with the advantageous system of the present invention, may be either a.c., d.c., or combinations thereof.

The electron beam address system does not itself illuminate the image which it creates. However, external sources of light 38 and 39 are illustrated to show that the liquid crystalline imaging member comprising the face of vacuum tube 28 may be observed by light transmitted, as from light source 38, or reflected, as from light source 39. Alternatively, transmitted light may originate from a source placed inside vacuum tube 28 at a location indicated, for example, at point 40. However, the in-tube source of illumination should be so placed so as to not interfere with the electron beam which creates the image on the face of the tube.

In related embodiments, the substantially insulating overlayer 36 may be selected from materials which may exhibit secondary emission effects when bombarded by the initial electron beam, and such secondary emissions may be the imaging emissions, or, alternatively, the secondary emission system may be suitable as a method for erasing the previous image on the liquid crystalline imaging member.

In FIG. 6 an X-Y address system suitable for imaging a liquid crystalline imaging member is illustrated in exploded isometric view. The liquid crystalline imaging film is placed in void area 20 within the transparent and substantially insulating spacer-gasket 13. The liquid crystalline film and spacer 13 are sandwiched between a pair of substantially transparent electrodes comprising transparent support plates 11 upon which strips of substantially transparent, conductive material 41 is coated. The substantially transparent electrodes are oriented so that conductive strips 41b and conductive strips 41a on the respective electrodes cross each other in an X-Y matrix or grid. Each conductive strip in each set of parallel strips 41a and 41b, is electrically connected to a circuit system 42 which is suitable for selective or sequential operation. Through selection systems 42 and external circuit 15 including source of potential 16, an electric field suitable for creating the optical negative-positive cholesteric-nematic phase transition of the advantageous system of the present invention can be created across selected points or a selected sequence of points in the illustrated imaging system. It will be understood that substantially transparent conductive strips 41 may vary in width from a very fine, wire-like structure to any desired strip width. In addition, one support plate 11 may be opaque where the imaging system is to be observed from one side, using only reflected light.

In FIG. 7 the advantageous liquid crystalline imaging member of the present invention is shown in a system where said member is imaged by an electrostatic latent image on an electrostatic latent image support surface such as a photoconductive layer. In FIG. 7 typically transparent, support substrate 11 is shown with typically substantially transparent conductive coating 12 which is grounded at 43. Adjacent substantially transparent conductive coating 12 spacer-gasket 13 contains liquid crystalline imaging layer 20 between the substantially transparent grounded electrode and an electrostatic latent image support surface. The electrostatic latent image support surface may be any substantially insulating surface which is capable of supporting an electrostatic latent image. The electrostatic latent image supported by said surface, when taken in conjunction with grounded substantially transparent conductive layer 12 creates an imagewise electrical field across liquid crystalline imaging layer 20, and said field causes the advantageous optical negative-positive, cholestericnematic phase transition of the advantageous system of the present invention. A typical electrostatic latent image support surface is a photoconductive plate, for example as typically used in xerography. As illustrated, conductive supporting layer 44 supports a layer of photoconductive material 45, typically comprising selenium, mixtures of sulphur and selenium, phthalocyanine, or any other photoconductive insulating layer. Between the photoconductive insulating layer 45 and liquid crystalline imaging layer 20 there may be an insulating protective layer 46 which may retain the liquid crystalline substance in some embodiments, and at the same time layer 46 protects both the liquid crystalline layer and the photoconductive insulating layer 45.

An electrostatic latent image may be created on the photoconductive layer 45 by a variety of means, for example, by typical xerographic process steps as described in Carlson U.S. Pat. No. 2,297,691, by corona charging, or by breakdown techniques described, for example in Carlson U.S. Pat. No. 2,982,647, and Walkup U.S. Pat. No. 2,825,814 and No. 2,937,943, or by charge patterns conforming to selected shaped electrodes or combinations of electrodes and created by the "TESI" discharge technique described in Schwertz U.S. Pat. No. 3,023,731 and No. 2,919,967.

The electrostatic latent image can be created on the photoconductive insulating layer 45 before the photoconductive layer is brought into proximity with the liquid crystalline imaging layer. However, in certain embodiments it is possible to create the electrostatic latent image on the photoconductive insulating layer while the photoconductor is in close proximity with the liquid crystalline imaging layer. The resulting image is then viewed through substantially transparent layers 11 and 12.

Figure 8:
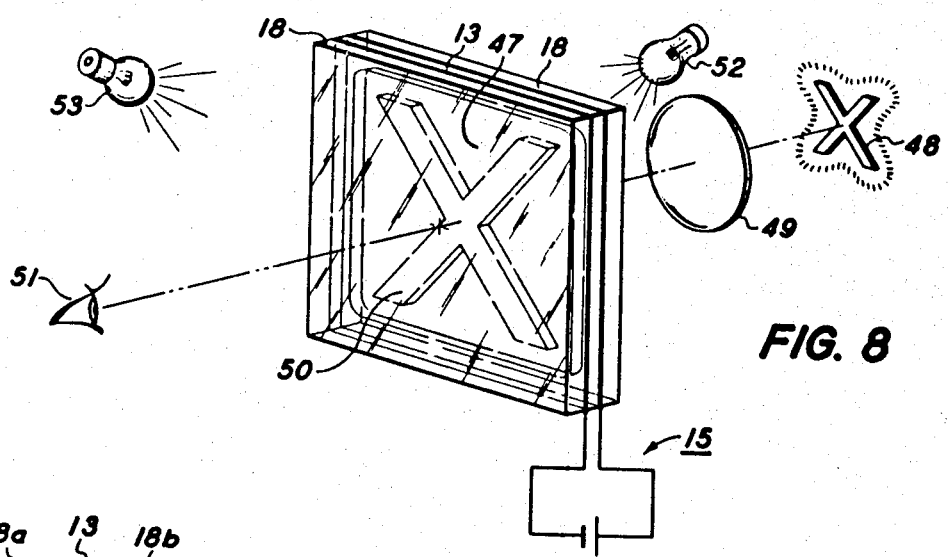
FIG. 8 is an isometric view of a liquid crystalline imaging member imaged by a thermal image projection address system.

In FIG. 8 a liquid crystalline imaging member is shown imaged by a thermal image projection address system. Here the liquid crystalline imaging member comprises substantially transparent electrodes 18 separated by spacing gasket 13 which encloses a cholesteric liquid crystal within space 47 comprising substantially all of the area within spacer gasket 13. In this embodiment of the inventive system a source of a thermal image 48, here a heat source in the desired image configuration, is shown in position with conventional means 49 for focusing and projecting a thermal or optical image, and the thermal image 50 appears in the liquid crystalline film in the areas where the liquid crystalline substance is heated into the temperature range required for the optical negative-positive, cholesteric-nematic phase transition, while at the same time, the liquid crystalline imaging member is biased by external circuit 15 so that the field across the cholesteric liquid crystalline film is sufficient to cause the phase transition when the imaged area of the film reaches the transition threshold temperature. An observer 51 sees the transformed image area 50 become transparent to transmitted light from source 52, or go blank in reflected light from source 53, as the phase change occurs in response to the thermal image. If the imaging member is observed while between polarizers, as described in FIG. 4, the imaged area of the liquid crystal imaging member would appear dark to the observer 51 while the non-imaged areas 47 would remain substantially unchanged as a result of light scattering.

It will be understood that any suitable means for projecting a thermal image will be useful in this embodiment of the inventive system. It will also be appreciated that the thermal imaging system may be used without projection means 49 if the thermal image is sufficiently defined and very close to the imaging member itself. In either case, the resolution of the image in the liquid crystal film is dependent upon the thermal conductivity characteristics of the liquid crystal film and the adjacent layers in the imaging member.

Figure 9:
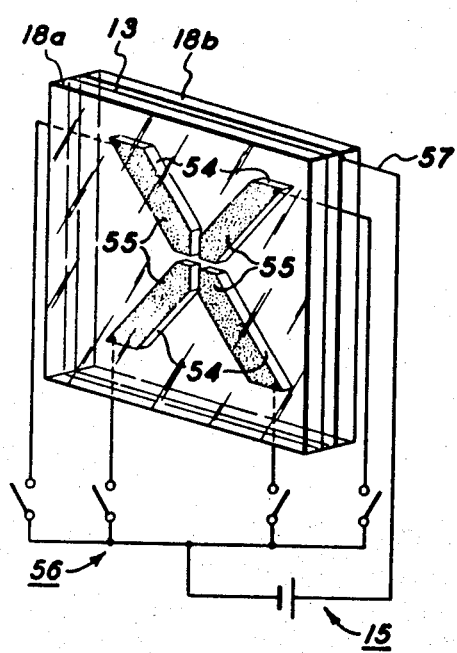
FIG. 9 is an isometric view of a uni-planar, multiple cell, liquid crystalline imaging member.

FIG. 9 illustrates a uni-planar, multiple cell, liquid crystalline imaging member suitable for use with the electrical field-induced phase transition imaging system of the present invention. In the imaging member of FIG. 9 the substantially transparent electrodes 18 are separated by the typical spacer gasket 13 which contains voids 54 which contain the liquid crystal film. Corresponding areas 55 are the shaped, substantially transparent, conductive coating on the inner surface of electrode 18a. Each one of these cells 55 is capable of being selectively imaged either individually, or jointly, as desired, through the use of switching system 56 in external circuit 15 which is also connected to the substantially transparent conductive layer on the inner surface of substantially transparent electrode 18b, by electrical lead 57. It will be appreciated that uni-planar, multiple cell, imaging members such as the one in FIG. 9 may be designed so that various combinations of the desired image cells may be imaged to create any desired figure or character in any language or number system. It will also be appreciated, that either a character shaped spacer as described in FIG. 2, or a character-shaped electrode system as described in FIG. 3, in addition to the combination shaped spacer and electrode system here described in FIG. 9, can be used in such a uni-planar, multiple image system.

The electrical field-induced optically negative-positive phase transition of the present invention has also been found to be suitable as a transient, color display when the field strength of the electrical field across the liquid crystal imaging layer is decreased to a value below the threshold field necessary to produce the phase transition at the corresponding temperature. With the field strength below the threshold field value, the field-induced image is allowed to resume its original, cholesteric liquid crystal state over a period which may vary from fractions of a second to minutes or hours, depending upon the specific embodiment of the inventive system. Transient imaging systems may make use of all or any portion of this relaxation transition period. It is noteworthy that the transient display characteristics are observed when the relaxation-transition occurs in the absence of an electric field of opposite polarity. As the initially sharp, field-induced optically positive, nematic image relaxes back into its original, cholesteric state, the birefringence of the liquid crystalline material changes drastically giving rise to changing color patterns which stand out vividly from the background areas of the liquid crystal imaging member. This relaxation-transition occurs over a sufficient number of seconds to be quite useful as a dynamic, color display system.

The following examples further specifically define the present invention with respect to transforming a cholesteric liquid crystalline substance to the nematic liquid crystalline mesophase by an applied electrical field. The parts and percentages are by weight unless otherwise indicated. The examples below are intended to illustrate various preferred embodiments of the novel electrical field-induced cholesteric-nematic mesophase transition and liquid crystal imaging system.

EXAMPLE I

The electrical field-induced optical negative-positive, cholesteric-nematic mesophase transition is observed in the following liquid crystal imaging member: a mixture of liquid crystal materials of about 30 percent cholesteryl chloride, about 56 percent cholesteryl nonanoate, and about 14 percent cholesteryl oleyl carbonate is prepared. A layer of the cholesteric liquid crystal mixture is placed between and in contact with a pair of substantially transparent electrodes of NESA glass available from the Pittsburgh Plate Glass Company. The transparent electrodes are separated by about one-fourth mil and the electrodes are connected in circuit with an electrical generator and a source of white light is placed behind the entire imaging member.

The liquid crystal mixture normally appears as a light scattering, white, opalescent, translucent sheet. An electrical field of field strength of about $10^5$ volts/cm. is then applied across the liquid crystal layer. In the presence of this field, the imaged portion of the liquid crystal layer assumes a colorless, transparent appearance.

The same imaging member is viewed with a linear analyzer while plane-polarized light is normally incident on the imaging member. By viewing with the linear analyzer, the optical negative-positive, cholesteric-nematic transition is observed because it is impossible to extinguish the field of view with the linear analyzer when the cholesteric liquid crystal layer is viewed with plane-polarized light incident before the phase transition takes place. After the phase transition takes place, the normally incident, plane-polarized light emerges plane-polarized through the electrical field-induced image areas, and may be extinguished when viewed with the linear analyzer. However, the transformed liquid crystal material is not optically isotropic. Plane polarized light obliquely incident on the imaging member does not emerge plane-polarized, indicating that the film is acting as a birefringent material with an optic axis perpendicular to the surface of the liquid crystal layer, i.e., parallel to the applied electrical field.

EXAMPLE II

The electrical field-induced mesophase transition is confirmed by observations of a liquid crystal imaging member using a Leitz Ortholux polarizing microscope with a 50x objective lens and convergent light. The cholesteric liquid crystal mixture disclosed in Example I is placed between a pair of substantially transparent electrodes. The lower electrode is a NESA glass plate, as described in Example I. The upper electrode is a glass microslide about 0.2 mm. in thickness, upon which a substantially transparent (optical density of about 0.3) conductive coating of chromium is evaporated. The conductive coatings of the transparent electrodes are spaced apart by a spacing gasket about one-fourth mil in thickness, comprising "Mylar," a polyethylene terephthalate polyester available from E. I. duPont deNemours & Co., Wilmington, Delaware. The liquid crystal mixture contacts both transparent electrodes and is contained within the spacing gasket.

This imaging member or cell is then observed through the Leitz Ortholux polarizing microscope, and the uniaxial character of the film and the sign of the birefringence are determined. Cholesteric liquid crystals have negative birefringence characteristics (see Gray, G. W., *Molecular Structure and the Properties of Liquid Crystals*, Academic Press, New York, 1962, p. 40). Without applying a field to the imaging member, a gypsum first-order-red plate is inserted and a color figure results which is characteristic of optically negative uniaxial materials, (as reported in Wahlstrom, E. E., *Optical Crystallography*, John Wiley & Sons, New York, 1966, 3rd ed., p. 202); here the first and third quadrants of the conoscopic patterns are yellow while the second and fourth are blue. Then a field of about $10^5$ volts/cm. is applied. With the applied field, the conoscopic color pattern quickly inverts to a pattern characteristic of optically positive uniaxial material; that is, the first and third quadrants become blue while the second and fourth become yellow.

Nematic and smectic liquid crystalline mesophase structures exhibit positive birefringence characteristics (see Gray, supra). It is therefore clear that the electrical field-induced transition is either a cholesteric-nematic or a cholesteric-smectic phase transition. It is believed that the novel phase transition of the present invention is a cholestericnematic phase transition. Such a phase transition induced by magnetic fields has previously been reported in Sackmann, Meiboom & Snyder, J. Am. Chem. Soc., 89, 5981 (1967).

The phase transition in the new and surprising system of the present invention is not attributable to mechanical pressure which is created by electrostatic forces on the transparent electrodes in the inventive system. When purely mechanical pressure is applied to such a liquid crystalline imaging sandwich, the phase transition does not occur.

EXAMPLE III

Figure 10:
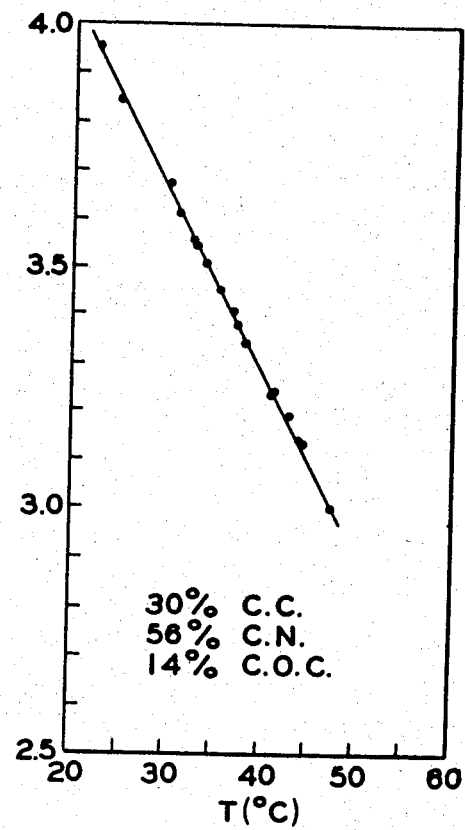
FIG. 10 is a Threshold field vs. Temperature plot for the electrical field induced cholesteric-nematic phase transition of a specific cholesteric liquid crystal mixture.

Using the cholesteric liquid crystal imaging member described in Example II, the temperature dependence of the threshold of the phase change inducing field is measured. The experimental data for threshold field necessary for phase transition versus temperature are shown in FIG. 10 wherein the field is expressed in volts per centimeter times $10^{-5}$, and the temperature is expressed in degrees Centigrade. It is observed that the threshold field decreases rapidly with increasing temperature. The isotropic temperature of the mixture of about 30:56:14 cholesteryl chloride:nonanoate:oleyl carbonate, respectively, is about 57°C. This isotropic temperature is the point at which the liquid crystal mixture changes to the completely liquid physical state.

The Threshold field versus Temperature relationship of FIG. 10 defines the operating range for the electrical field-induced cholesteric-nematic phase transition imaging member of the present invention having a cholesteric liquid crystal imaging layer comprising the mixture of about 30% C.C.: 56% C.N.: 14% C.O.C. The preferred operating ranges for this mixture are: temperatures in the range of about 20° to about 57°C and electrical field strengths in the range of about $2.7 \times 10^5$ to about $4.0 \times 10^5$ Volts/cm. of liquid crystalline material.

EXAMPLE IV

A mixture of liquid crystals of about 20 percent cholesteryl chloride and about 80 percent cholesteryl nonanoate is placed between electrodes as described in Example II, which are spaced at a distance of about 10 microns. Threshold field versus temperature data for this sample show that the temperature sensitivity of this system is about 10 Volts/°C or 1 Volt/micron/°C. For each degree increase in operating temperature, the threshold voltage is reduced by about 10 volts. With this display cell biased about 10 volts below the threshold field at one temperature, the phase transition is achieved by increasing the bias by about 10 volts, or by increasing the temperature by about 1°C. It is seen that this display is imaged by either an increased thermal or increased electrical input.

EXAMPLES V-VIII

The transparent imaging cell and circuit described in Example I are used for electrical field-induced optically negative-positive, cholesteric-nematic liquid crystal imaging using cholesteryl halides as the liquid crystal imaging layer. The threshold field values vary depending upon the liquid crystalline material used, but in each case the field strength is typically greater than about $10^2$ Volts/cm. The following liquid crystals are used:

V Cholesteryl Chloride
VI Cholesteryl Bromide
VII Cholesteryl Iodide
VIII Cholesteryl Fluoride In each case, the phase transition imaging is observed.

EXAMPLES IX-XX

The transparent imaging cell and circuit described in Example V are used for the inventive imaging system, using cholesteryl esters of carboxylic acids as the liquid crystal imaging layer. The following liquid crystals are used:

IX Cholesteryl Formate
X Cholesteryl Nonanoate
XI Cholesteryl Propionate
XII Cholesteryl Myristate
XIII Cholesteryl Laurate
XIV Cholesteryl Hexanoate XV Cholesteryl Heptanoate
XVI Cholesteryl Palmitate
XVII Cholesteryl Dodecanoate
XVIII Cholesteryl Tetradecanoate
XIX Cholesteryl Stearate
XX Cholesteryl Oleate In each case, the phase transition imaging is observed.

EXAMPLE XXI

The transparent imaging cell and circuit described in Example V are used for the inventive imaging system using cholesteryl oleyl carbonate as the liquid crystal imaging layer.

EXAMPLE XXII

The transparent imaging cell and circuit described in Example V are used for the inventive imaging system using sitosteryl chloride as the liquid crystal imaging layer.

EXAMPLES XXIII–XLII

The transparent imaging cell and circuit described in Example I are used for the inventive imaging system, using mixtures of cholesteryl halides, cholesteryl esters of carboxylic acids and other helicoidal liquid crystals as the liquid crystalline imaging layer. The following liquid crystal mixtures are used:

Cholesteryl chloride (C.C.): cholesteryl nonanoate (C.N.) mixtures of about the following compositions:
  XXIII about 20% C.C. : about 80% C.N.
  XXIV about 22% C.C. : about 78% C.N.
  XXV about 25% C.C. : about 75% C.N.
  XXVI about 35% C.C. : about 65% C.N.
  XXVII about 40% C.C. : about 60% C.N.
  XXVIII about 45% C.C. : about 55% C.N.
  XXIX about 55% C.C. : about 45% C.N.
  XXX about 60% C.C. : about 40% C.N.
  XXXI about 65% C.C. : about 35% C.N.
  XXXII about 90% C.C. : about 10% C.N.

The 20:80 mixture of Example XXIII has operating ranges of about 20° to about 75°C at threshold field strengths of about $11 \times 10^5$ to about $5.3 \times 10^5$ Volts/cm. of liquid crystal imaging layer. This field varies almost linearly with temperature. This mixture is particularly preferred because of the breadth of the temperature range throughout which the phase transition imaging is observed.

The 60:40 mixture of Example XXX has operating ranges of about 25° to about 60°C at field strengths of about $4 \times 10^3$ to about $4 \times 10^4$ Volts/cm. of liquid crystal imaging layer. The threshold field versus temperature data (similar to FIG. 10) for this mixture exhibits a minimum at about 40°C and about $4 \times 10^3$ Volts/cm., and behaves almost linearly on both sides of that minimum, rising to field strengths of about $3 \times 10^4$ Volts/cm. at about 25°C and about $4 \times 10^4$ Volts/cm. at about 60°C, the end points of the range. This mixture is particularly preferred because of the relatively low field strength values required for the phase transition imaging.

The 65:35 mixture of Example XXXI has an operating range of about 20° to about 60°C at threshold field strengths which are substantially independent of temperature, at field strengths of about $7.4 \times 10^4$ Volts/cm. of liquid crystal imaging layer. This mixture is particularly preferred because of the relatively low, and independent threshold field strength.

XXXIII about 35% cholesteryl iodide : about 67% cholesteryl nonanoate.
  XXXIV about 35% cholesteryl bromide : about 65% cholesteryl nonanoate.
  XXXV about 35% sitosteryl chloride : about 65% cholesteryl nonanoate.
  XXXVI about 48% cholesteryl chloride : about 52% cholesteryl propionate.

This mixture of Example XXXVI has an operating range of about 20° to about 80°C, and the threshold field strength is substantially independent of temperature at a field strength value of about $2.8 \times 10^4$ Volts/cm. of liquid crystal imaging layer. This mixture is particularly preferred because of the relatively low value of its operative threshold field and the breadth of the operative temperature range at that threshold field value.

XXXVII about 40% cholesteryl chloride : about 60% cholesteryl myristate.
  XXXVII about 42% cholesteryl chloride : about 58% cholesteryl laurate.
  XXXVIII about 46% cholesteryl chloride : about 54% cholesteryl hexanoate.
  XXXIX about 45% cholesteryl chloride : about 55% cholesteryl heptanoate.
  XL about 39% cholesteryl chloride : about 61% cholesteryl palmitate.
  XLI about 51% cholesteryl chloride : about 34% cholesteryl nonanoate : about 15% cholesteryl oleyl carbonate.
  XLII about 40% cholesteryl chloride : about 26% cholesteryl nonanoate : about 34% cholesteryl oleyl carbonate.

In each case the phase transition imaging is observed.

EXAMPLES XLIII–XLV

The transparent imaging cell and circuit described in Example I are used for the inventive imaging system, using mixtures of various helicoidal, cholesteric liquid crystalline materials with materials which are already in the nematic liquid crystalline mesophase structure. The following mixtures of cholesteric and nematic liquid crystals are used:

XLIII about nine-tenths by weight of a mixture of cholesteric liquid crystals comprising about 60% cholesteryl chloride and about 40% cholesteryl nonanoate, is mixed with about one-tenth by weight of N-p-methoxybenzylidene-p-phenylazoanite.

XLIV about two-thirds by weight of a mixture of cholesteric liquid crystals comprising about 46% cholesteryl chloride, about 30% cholesteryl nonanoate and about 24% cholesteryl oleyl carbonate, is mixed with about one-third by weight of p-azoxyanizole.

XLV about two-thirds by weight of a mixture of cholesteric liquid crystals comprising about 77% cholesteryl chloride, about 9% cholesteryl nonanoate and about 14% cholesteryl oleyl carbonate, is mixed with about one-third by weight of p-azoxyanizole.

In each case the phase transition imaging is observed.

EXAMPLE XLVI

Using the thin, substantially transparent upper electrode and cell described in Example II, and using a liquid crystal imaging layer of a mixture of about 60 percent cholesteryl chloride and about 40 percent cholesteryl nonanoate contained between the substantially transparent electrodes by a "Mylar" spacer-gasket of thickness of about 2 mils, the complete imaging member is imaged by a thermal address system. The threshold field for this liquid crystal mixture is about 180 volts across the about 2 mil layer of liquid crystal material. However for use in the thermal address system, the voltage across the about 2 mil layer is reduced to about 100 volts. The hot tip of a commercially available soldering iron is then brought into close proximity with the thin, upper electrode. The increase in temperature caused by the thermal energy from the hot soldering iron causes the imaging member to be imaged in a diffuse pattern resembling the tip of the soldering iron, the source of the thermal image in this Example.

EXAMPLE XLVII

A pair of substantially transparent electrodes of glass upon which separated strips about one-fourth inch in width, of substantially transparent, conductive chromium are evaporated, are used in the liquid crystal imaging member described in Example I. Each conductive strip is provided with a separate lead through which the strip can be electrically connected in a circuit with a potential source which is similarly connected to another strip on the opposite electrode. The substantially transparent electrodes are oriented so that the conductive strips on each electrode cross approximately perpendicularly, thereby forming an imaging matrix or grid across the liquid crystalline imaging layer described in Example I. The opposite poles of the potential source are selectively or sequentially connected to the leads of the individual conductive strips on the opposite, substantially transparent electrodes, and various selected portions of the liquid crystalline imaging layer are thereby imaged by the phase transformation caused by the creation of a suitable imaging field across selected local areas of the imaging layer.

EXAMPLE XLVIII

A pair of NESA glass transparent electrodes as described in Example I is spaced by a "Mylar" spacer of thickness of about 1 mil, into which a large figure X is cut, so that it will cover a substantial portion of the area of the imaging member. A liquid crystal mixture comprising about 60 percent cholesteryl chloride and about 40 percent cholesteryl nonanoate is prepared and placed within the void area in the spacer created by the cut-out X region. The transparent electrodes are connected to an appropriate external circuit and a field of about $5 \times 10^4$ Volts/cm. is placed across the sample of the liquid crystal mixture. When viewed between crossed polarizers, with transmitted light, the X image region appears black on a light background caused by light scattering and birefringence in the remainder of the "Mylar" spacer.

EXAMPLE XLIX

Using the liquid crystal imaging sandwich described in Example XLVIII, the electrical field-induced optically negative-positive, cholesteric-nematic phase transition imaging process is carried out, and the electrodes of the imaged sandwich are then grounded. Within a time interval of a few seconds after the electrodes are grounded, the field-induced nematic image area transiently relaxes back into its original, cholesteric liquid crystalline state. As this relaxation occurs, the apparent birefringence of the material changes giving rise to changing color patterns which stand out vividly from the background as the relaxation continues.

Although specific components and proportions have been stated in the above description of the preferred embodiments of the electrical field-induced optically negative-positive, cholesteric-nematic mesophase transition in a liquid crystalline imaging system, other suitable materials and variations in the various steps in the system as listed herein, may be used with satisfactory results and various degrees of quality. In addition, other materials and steps may be added to those used herein and variations may be made in the process to synergize, enhance, or otherwise modify the properties of the invention. For example, various other mixtures of liquid crystals which will undergo the inventive phase transition may be discovered and used in the system of the present invention, and such mixtures may require somewhat different threshold field and temperature ranges for preferred results. Likewise, various other means of creating the electrical field or projecting thermal images to address the inventive imaging member may be used with satisfactory results in the inventive system.

It will be understood that various other changes in the details, materials, steps, and arrangements of elements which have been herein described and illustrated in order to explain the nature of the invention, will occur to and may be made by those skilled in the art, upon a reading of this disclosure, and such changes are intended to be included within the principle and scope of this invention.

What is claimed is:

1. The method of imaging a liquid crystalline imaging member comprising providing a layer of liquid crystalline material shaped in image configuration between a pair of electrodes, one of which is substantially transparent, said liquid crystalline material being in the cholesteric mesophase structure and being at a temperature within the optically negative-positive transition range of said liquid crystalline material; and
    applying an electrical field across said liquid crystalline layer within the optically negative-positive transition electrical field strength range of said liquid crystalline material.

2. The method of claim 1 wherein both electrodes are substantially transparent.

3. The method of claim 1 wherein a plurality of independently operable cholesteric liquid crystalline imaging cells are provided in a planar imaging system and said individual cells are independently imaged to provide a desired composite image on the planar imaging system.

4. The method of claim 3 wherein the imaging member is viewed with means for enhancing contrast between image and background areas.

5. The method of claim 3 wherein the imaging member is viewed between polarizers.

6. The method of claim 1 wherein the imaging member is viewed with means for enhancing contrast between image and background areas.

7. The method of claim 1 wherein the imaging member is viewed between polarizers.

8. The method of imaging a liquid crystalline imaging member comprising providing a layer of liquid crystalline material between a pair of electrodes one of which is substantially transparent and one of which is shaped in the desired image configuration, said liquid crystalline material being in the cholesteric mesophase structure and being at a temperature within the optically negative-positive transition range of said liquid crystalline material; and applying an electrical field across said liquid crystalline layer within the optically negative-positive transition electrical field strength range of said liquid crystalline material.

9. The method of claim 8 wherein both electrodes are substantially transparent.

10. The method of claim 8 wherein both electrodes are shaped in the desired image configuration.

11. The method of claim 8 wherein a plurality of independently operable cholesteric liquid crystalline imaging cells are provided in a planar imaging system and said individual cells are independently imaged to provide a desired composite image on the planar imaging system.

12. The method of claim 11 wherein the layer of cholesteric liquid crystalline material is shaped in the same image configuration as the shaped electrode, and said congruently shaped liquid crystalline imaging layers and electrodes are adjacent one another in the planar imaging system.

13. The method of claim 8 wherein the imaging member is viewed with means for enhancing contrast between image and background areas.

14. The method of claim 8 wherein the imaging member is viewed between polarizers.

* * * * *